(12) United States Patent
Ramsey et al.

(10) Patent No.: US 7,814,092 B2
(45) Date of Patent: *Oct. 12, 2010

(54) DISTRIBUTED NAMED ENTITY RECOGNITION ARCHITECTURE

(75) Inventors: William D. Ramsey, Redmond, WA (US); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

This patent is subject to a terminal disclaimer.

(21) Appl. No.: 11/249,982

(22) Filed: Oct. 13, 2005

(65) Prior Publication Data

US 2007/0088696 A1    Apr. 19, 2007

(51) Int. Cl.
G06F 7/00 (2006.01)
G06F 17/30 (2006.01)
(52) U.S. Cl. ...................................................... 707/713
(58) Field of Classification Search ................ 707/104, 707/1, 6, 999.006, 713; 709/203; 705/51, 705/3, 10; 704/1; 726/5
See application file for complete search history.

(56) References Cited

U.S. PATENT DOCUMENTS

| | | | | |
|---|---|---|---|---|
| 5,611,048 A | * | 3/1997 | Jacobs et al. | 726/5 |
| 5,835,712 A | * | 11/1998 | DuFresne | 709/203 |
| 6,341,290 B1 | * | 1/2002 | Lombardo et al. | 707/104.1 |
| 2002/0040346 A1 | * | 4/2002 | Kwan | 705/51 |
| 2002/0099572 A1 | * | 7/2002 | Dyckman et al. | 705/3 |
| 2003/0130835 A1 | * | 7/2003 | Azzam et al. | 704/1 |
| 2005/0086049 A1 | * | 4/2005 | Bennett | 704/4 |
| 2008/0005090 A1 | * | 1/2008 | Khan et al. | 707/4 |

* cited by examiner

Primary Examiner—Mohammad Ali
Assistant Examiner—Alexey Shmatov
(74) Attorney, Agent, or Firm—Steven M. Koehler; Westman, Champlin & Kelly, P.A.

(57) ABSTRACT

A computer-implemented method of performing named entity recognition in a client-server environment includes providing a first named entity recognition module operable with a client machine in the client-server environment and a second named entity recognition module operable with a server in the client-server environment. The method also includes performing named entity recognition on the client machine to identify one or more domain dependent named entities in a set of tokens and data assessable to the client machine and performing named entity recognition on the server to identify one or more domain independent named entities in the set of tokens and data assessable to the server. A task is completed using at least information related to the identified named entities from the client machine and the server.

12 Claims, 5 Drawing Sheets

DISTRIBUTED NAMED ENTITY RECOGNITION ARCHITECTURE

BACKGROUND

The discussion below is merely provided for general background information and is not intended to be used as an aid in determining the scope of the claimed subject matter.

Named entity (NE) Recognition is an initial step for many tasks in the fields of natural language processing and Information Retrieval (IR). Named entities are typically important terms in sentences or phrases in that they comprise persons, places, amounts, dates and times to name just a few. In some applications, specific named entity recognizers are used to recognize specific types of named entities. For instance, in a query or command provided to a computer stating "schedule a meeting with JoeS for next Thursday", the word or token "JoeS" would be recognized by an EmailAlias named entity recognizer, while the terms "next Thursday" would be recognized by a DateTime named entity recognizer. Once the named entities have been recognized, the query can be thought of as "schedule a meeting with <EmailAlias> for <DateTime>", where <EmailAlias> and <DateTime> are slots for purposes of Information Retrieval and Semantic Slot-Filling (SF).

Difficulties however can exist when processing queries in a client-server environment. In this environment, a user provides input into a client machine that in turn forms a basis of a query to a server located remotely from the client, and more importantly is typically designed to service a number of non-related clients. For example, a server can perform certain tasks such as scheduling a meeting, sending email or arranging travel itineraries to name just a few. Named entity recognition is difficult in this environment because the tasks to be performed by the server (e.g. information retrieval) may not be well defined or even known on the client machine, thereby making named entity recognition for the task to be performed or processed by the server extremely difficult. Likewise, the server will not have access to specific information residing on each of the client machines such as a contacts list of the user having specific names and email addresses that the user corresponds with. Accordingly, named entity recognition in this environment is a problem.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

Named entity recognizers are distributed throughout a client-server system based on where the data for named entity recognition resides, or is accessible. In particular, the system can include "local" named entity recognizers that reside on the client machine, server, or corresponding local network that recognizes data that only exists within each respective domain, while "global" named entity recognizers can reside either on client machines and/or servers to recognize named entities that are domain-independent. When the output information from each of the named entity recognizers is provided to an application, which may reside either on the client and/or server, the application benefits from the richer and more accurate information in order to complete the task in accordance with the intended query.

DETAILED DESCRIPTION

One aspect of concepts herein described provides a distributed named entity recognition architecture for a client-server system that allows named entity recognizers to exist wherever pertinent named entity data resides, or is accessible. Such a system can include "local" named entity recognizers that reside on the client machine, server, or corresponding local network that recognizes data that only exists within each respective domain, while "global" named entity recognizers can reside either on client machines and/or servers and can be used to recognize, for example, named entities that are domain-independent.

Figure 4:
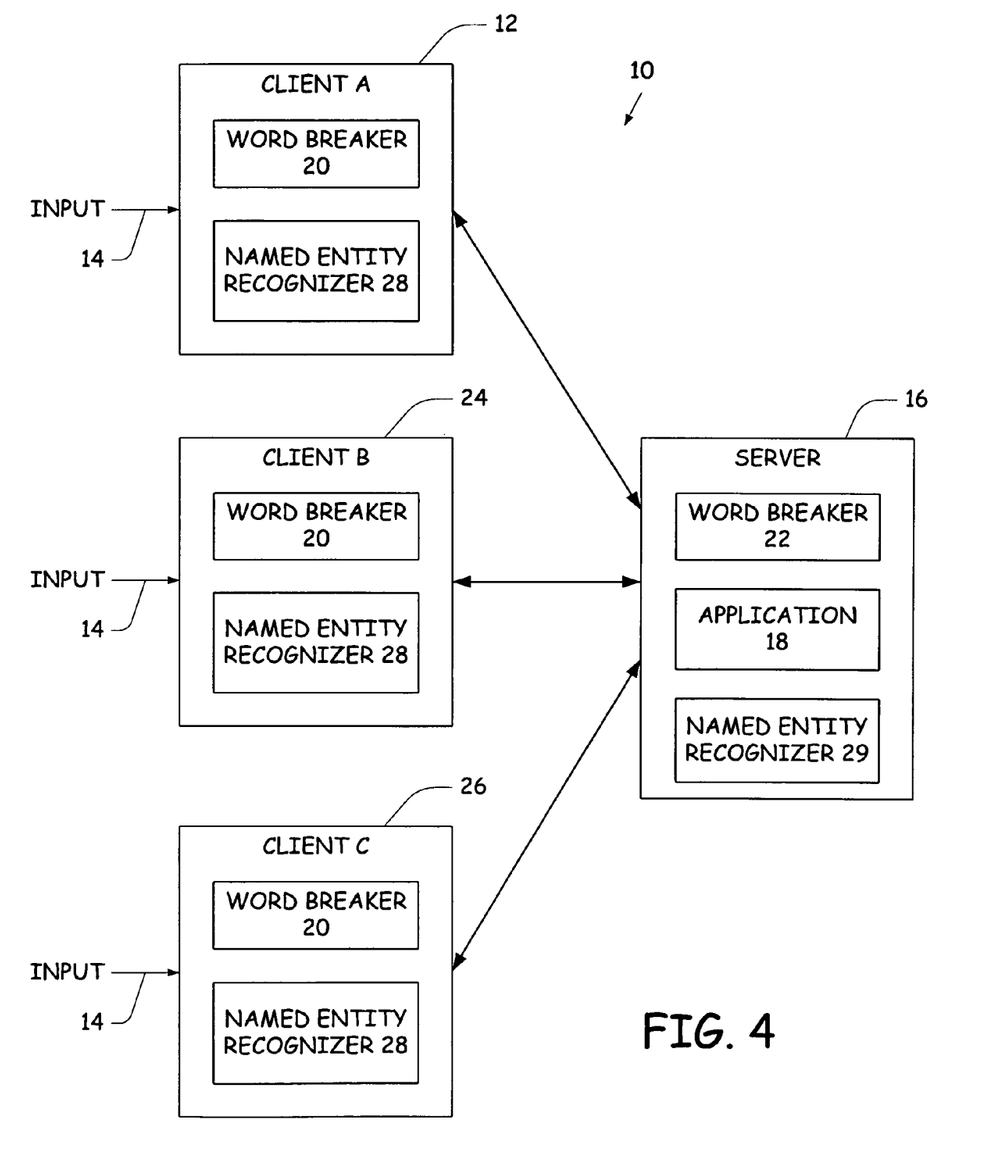
FIG. 4 is a block diagram of a client-server environment.

Referring to FIG. 4, a client-server system 10 includes a client machine or device 12 that receives an input 14 from a user not shown. The client machine 12 is operably connected to exchange information with a remote server 16, wherein the server 16 provides a service via an application 18 executed on the server 16 based on information received from the client 12.

As will be discussed below, client machine 12 may include a word-breaker module 20 configured to receive the input 14 from the user, typically in the form of a query, and generate therefrom tokens used by and provided to server 16 in order to complete a task such as but not limited to information retrieval. As used herein a "query" is any instruction based on the user's input to initiate a task such as but not limited to providing a command or an inquiry.

The tokens may also be required to be used on the client machine 12 and the word-breaker output from module 20 must be consistent with an output from a remote word-breaker module 22, herein illustrated as being part of server 16, but this illustration also represents being located remote from but addressable by server 16. In order for the client machine 12 to be able to pass usable information to the server 16, the token boundaries used by modules 20 and 22 are commonly identical, or at least identical enough to provide satisfactory results to the user.

Typically, server 16 is addressable and configured to operate with more than one client machines, which is illustrated in FIG. 4 where client machines 24 and 26 are also illustrated communicating with server 16. As appreciated by those skilled in the art, the server 16 can be addressable through a wide area network such as the Internet, or where the server 16 and the client machines 12, 24 and 26 are part of a local area network. The connections between the client machines 12, 24 and 26 with the server 16 can be formed with direct, "wired" connections, "wireless" connections or combinations thereof.

Figure 1:
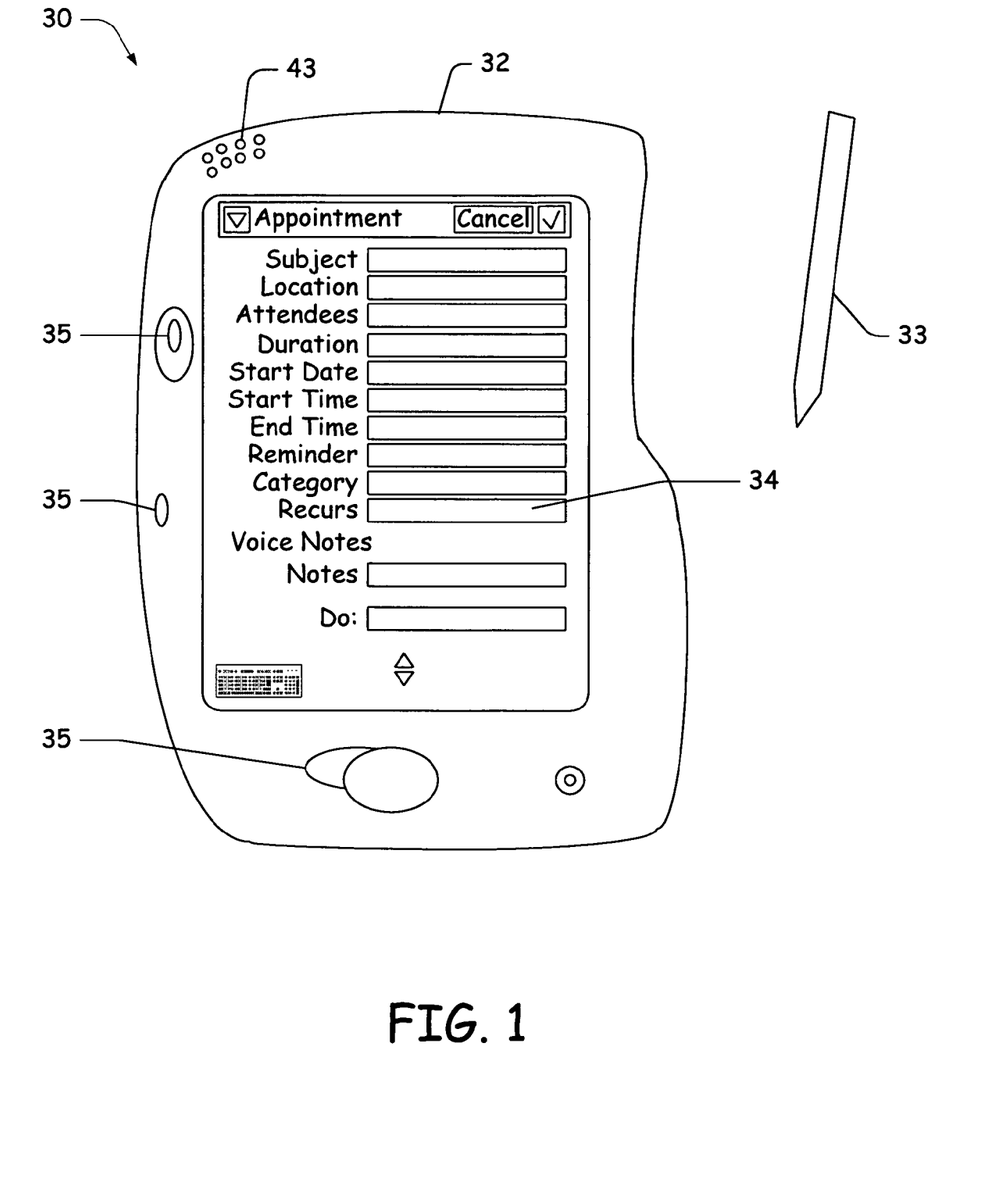
FIG. 1 is a top plan view of an embodiment of a computing environment.

Before describing further aspects, it may be useful to describe generally computing devices that can function in client-server system 10. Referring now to FIG. 1, an exemplary form of a data management device (PIM, PDA or the like) is illustrated at 30. However, it is contemplated that other computing devices can also be used. For example, phones and/or other data management devices can also benefit from concepts herein described. Accordingly, it is not intended that the scope of the client-server system 10 herein described be limited by the disclosure of the exemplary data management or PIM device herein illustrated.

The computing device 30 includes a housing 32 and has a user interface including a display 34, which uses a context sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the device 30 is not intended to be limited by these forms of input mechanisms. For instance, another form of input can include voice recognition, if desired.

Figure 2:
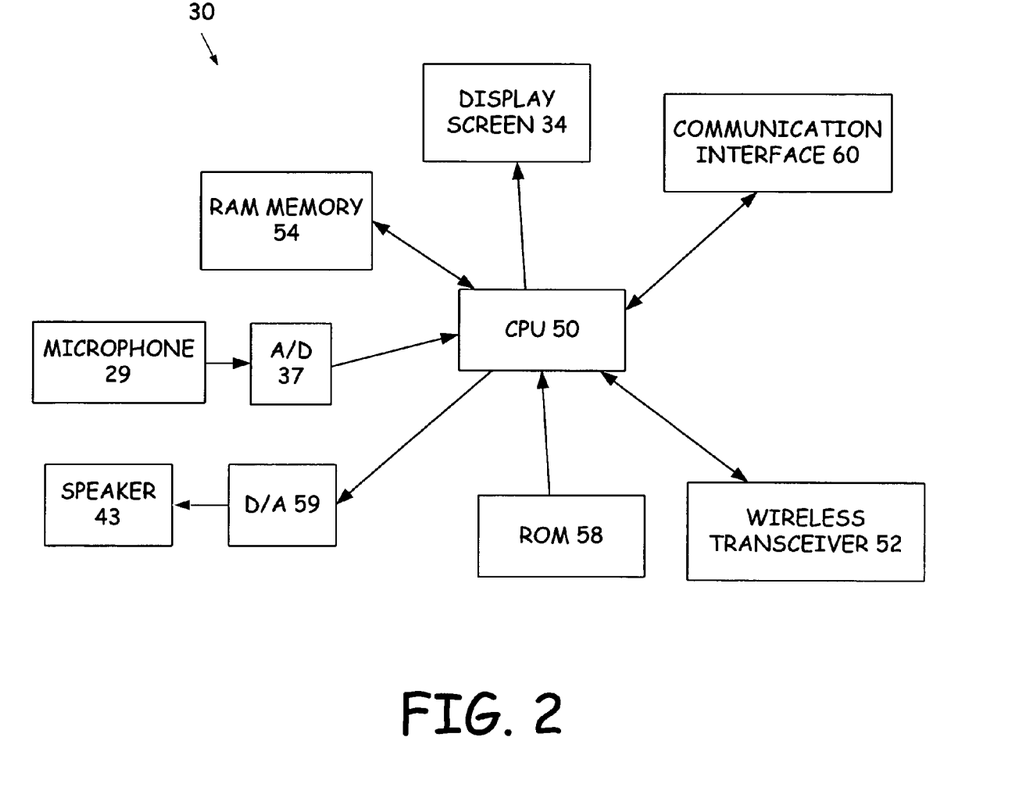
FIG. 2 is a block diagram of the embodiment of FIG. 1.

Referring now to FIG. 2, a block diagram illustrates functional components comprising the computing device 30. A central processing unit (CPU) 50 implements the software control functions. CPU 50 is coupled to the display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user in to device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device 30 that controls the basic functionality of the device 30 and other operating system Kernel functions (e.g., the loading of software components into RAM 54).

RAM 54 also serves as storage for code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30 generated speech signals that are digitized by A/D converter 37. A speech recognition program executed on device 30 or remotely can perform normalization and/or feature extraction functions on the digitized speech signals to obtain intermediate speech recognition results. Using wireless transceiver 52 or communication interface 60, speech data can be transmitted to a remote recognition server, not shown, wherein the results of which are provided back to device 30. Alternatively, recognition can be performed on device 30. Similar processing can be used for other forms of input, for example, handwriting recognition.

Figure 3:
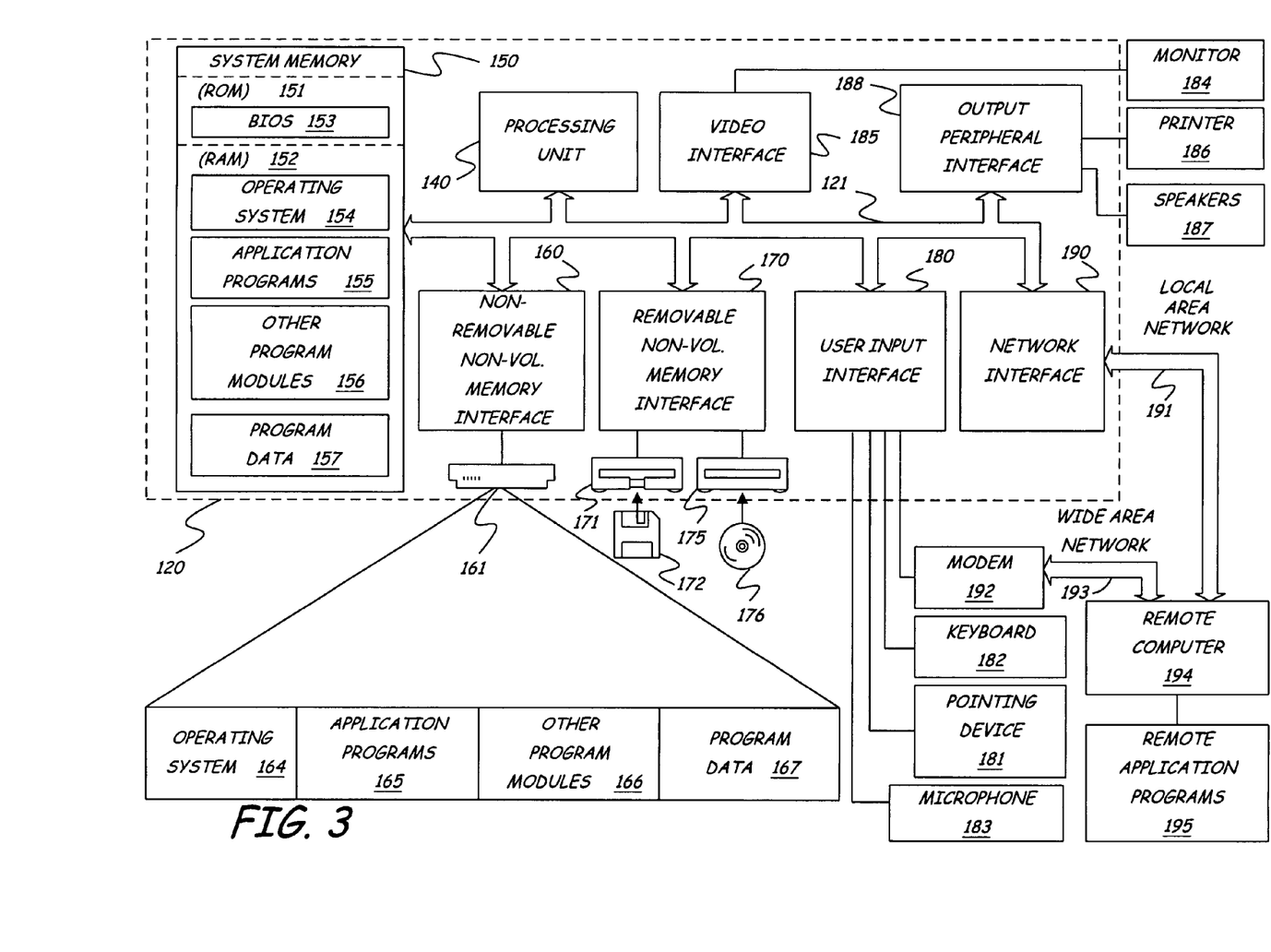
FIG. 3 is a block diagram of a second embodiment of a computing environment.

FIG. 3 illustrates another example of a suitable computing system environment 100 on which the concepts herein described may be implemented. The computing system environment 100 is again only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 3, an exemplary system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 3 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on remote computer 180. It will be appreciated that the network connections shown are exemplary and other means of establishing a communications link between the computers may be used.

It should be noted that the concepts herein described can be carried out on a computer system such as that described with respect to FIG. 3. However, other suitable systems include a server, a computer devoted to message handling, or on a distributed system in which different portions of the concepts are carried out on different parts of the distributed computing system.

As indicated above, one aspect includes a distributed named entity recognition architecture for a client-server computing environment 10. The named entity recognizers can be on the client machine 12, the server 16, or both the client machine 12 and the server 16, as illustrated. Named entity recognizers provide information necessary for completing a task performed by an application that can also either be on the client machine 12, the server 16, or both the client machine 12 and the server 16. It is important to note that aspects herein described are concerned with how the named entity recognizers can work with client-server applications and not with how the application may process the data received from the named entity recognizers. As appreciated by those skilled in the art, the applications can take a wide variety of forms. Therefore, for purposes of the present description, it is sufficient to state that the application(s) performs a task based on identified named entities provided to it.

Recognition is performed on the client machine 10 when either there is data that is not available on the server 16 such as machine-specific or domain-dependent information, or when distributing the computational load to the client machine is important. Information that may be domain-dependent might include but not limited to information stored in a "contacts" list of the user such as but not limited to names, email aliases, and addresses of family members or friends. Domain-dependent information can include information related to a local area network such as names, locations, and email aliases of co-workers in a company. Although this information may not be directly stored on the client machine 12, it is readily accessible to the client machine 12 such as accessing a list of email addresses stored on an email server that is otherwise not accessible to the server 16.

One or more named entity recognizers 28 are present on the client machine 12 to perform named entity recognition for the foregoing types of information. For example, an EmailAlias named entity recognizer can be provided to recognize EmailAliases present in the query that relate to a company address book (domain-dependent information), or a recently used email address stored on the client machine as in an email address cache. Another example of domain-dependent information can include meeting room names of a particular company used by the user of the client machine 12. Accordingly, a specific named entity recognizer can be provided to detect meeting rooms present in a query.

As further noted above, it may be advantageous for performance reasons to also perform named entity recognition on domain-independent named entities such as but not limited to date and time named entities. In some cases, these well-known named entity recognizers can be based on complex grammars or coding rather then on merely a list of possible named entities. For instance, date and time named entity recognition must allow for an infinite number of different dates and times since dates and times do not belong to a closed set. Many times these grammars can be relatively expensive execute when compared to the rest of the system. However, if the client machine 12 is capable of performing such type of named entity recognition (which includes having access to the information needed to perform recognition), the server 16 would not need to be called upon to perform such named entity recognition, thereby reducing server load and allowing the server 16 to serve other client machines. Likewise, there may be instances where the information used by the named entity recognizers is known to both the client machine 12 and server 16, but it would be desirable to have the server 16 perform recognition. Selective use of the client machine 12 or server 16 for performing named entity recognition can be accomplished by suitable communication between each of the client machine 12, server 16, application 18 or even a supervisory module (not shown) as necessary when one or more instances of application 18 and/or other applications are executing. Such communication can include simply the mere request to process the query.

The server 16 can also include one or more named entity recognizers 29. In particular, the server 16 can perform recognition of named entities that would be known on the server 16 and may not be resident on the client machine 12 due to, for example, downloading issues, or not wanting to have redundant client and server models.

The server-side named entity recognizers 29 can include "global" named entity recognizers and/or task-specific named entity recognizers. Global recognizers are a class of domain-independent named entity recognizers for recognizing concepts integers, strings, or Boolean values to name just a few. Likewise, global named entity recognizers can further include but are not limited to recognition of generic names or well-known information such as but not limited to individual states in the United States of America, cities having major airports, etc. These named entity recognizers may be simple lists of words as in the case with names of cities having major airports, or these recognizers may include grammar-based logic. Nevertheless, this kind of recognizer is based on general rules or general data, where no specific application can claim that the data or code is proprietary to it. As such global named entity recognizers would be used by many diverse applications.

Task-specific named entity recognizers are recognizers that are unique to a task and do not have a dependency on machine-specific or domain-dependent information. For example, the importance level of an email as being "high" or "low" is information that is unique to a "SendEmail task" and is machine-independent and domain-independent. As with the named entity recognizers described above, task-specific named entity recognizers maybe be either simple lists (i.e. list-based named entity recognizers) and/or contain sub-grammars or require executable code.

Figure 5:
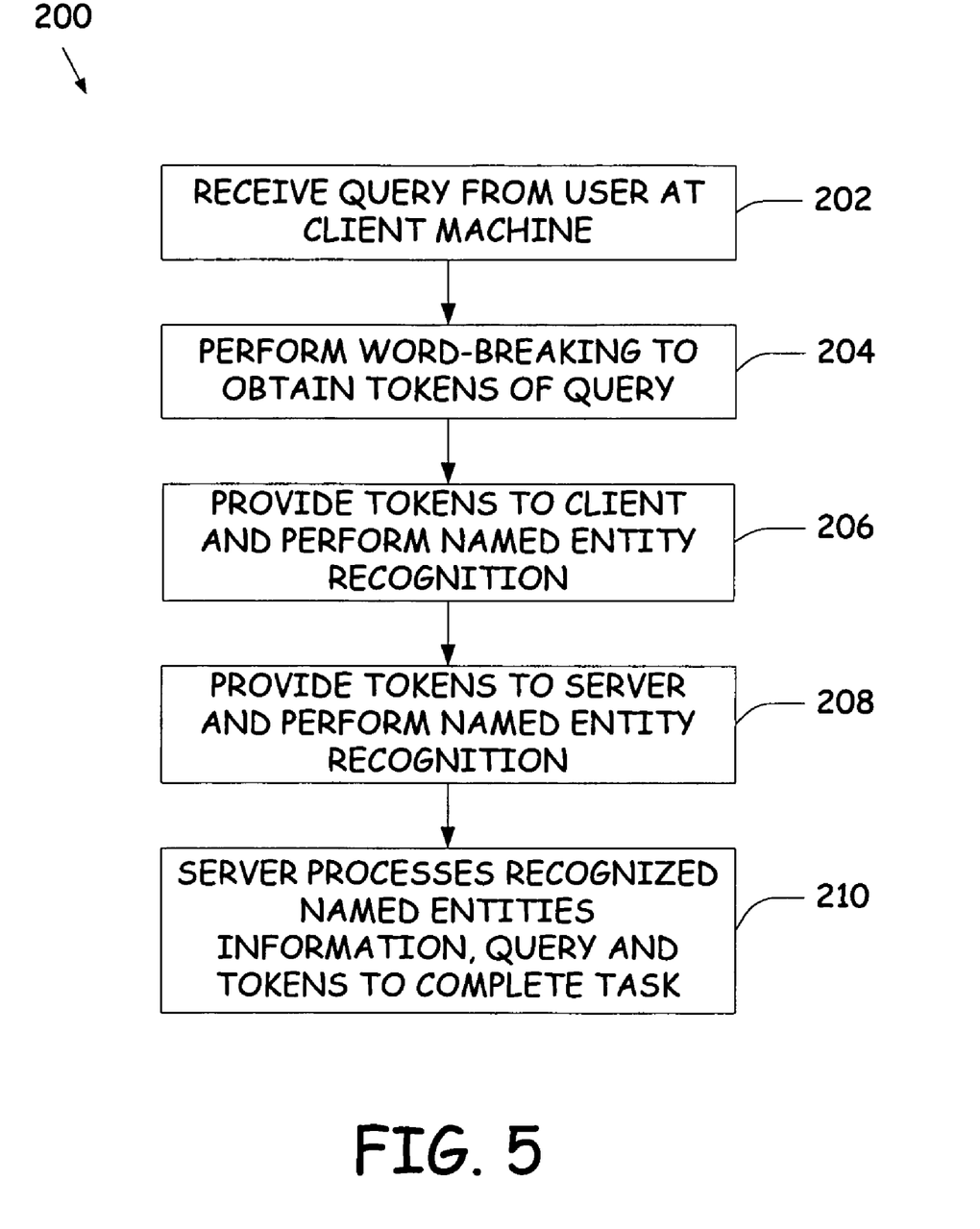
FIG. 5 is a flow chart illustrating a method for processing a query and performing named entity recognition.

Referring to FIG. 5, a method for processing a query from a client machine 12 using distributed named entity recognizers is illustrated as method 200. At step 202 a query is received from the user as input 14 to client machine 12. At step 204, word-breaking is performed on the query in order to generate a set of tokens for each of the respective words in the query. Word-breaking may be performed either on the client machine 12 or the server 16, or both the client machine 12 and the server 16. For understanding of the concepts described herein there is not a preference as to where such word-breaking is performed; however, co-pending application entitled "CLIENT-SERVER WORD-BREAKING FRAMEWORK" filed on even date herewith having Ser. No. 11/249,623 describes a framework where an explicit or implicit agreement is formed between the client machine 12 and the server 16 in order to provide a consistent indexing and retrieval task for an application in the client-server operating environment. Generally, word-breaking is performed so as to ensure that word-breaking of the query will be consistent with word-breaking from the information to be accessed and retrieved.

Using by way of example only an English query comprising "schedule important meeting with JoeS for next Thursday", operation of step 204 realizes a set of tokens {"schedule", "important", "meeting", "with", "JoeS", "for", "next", "Thursday"}. At step 206, the set of tokens are presented to any local named entity recognizer 28 residing on client-machine 12, which also includes for purposes of client side processing, any other computing device present in the domain, such as connected to client machine 12 via a local area network. Each of the client machine named entity recognizers 28 provides information indicating named entities recognized in the set of tokens. At step 208, the set of tokens on any named entity information recognized by the client machine 12 is provided to server 16.

At step 210 global named entity recognizers and/or task-specific named entity recognizers residing on server 16, or residing on any computing device that is considered part of the domain of the server 16 in a manner similar to that described above with respect to client machine 12, are used to analyze the set of tokens to provide corresponding named entity information.

At step 212, the application receives a set of tokens and the named entity information from both the client machine 12 and the server 16 in order to complete a task or provide the user with interpretations of the query (i.e. a list of possible tasks that the user intended). In the illustration of FIG. 4 and the fact that step 208 included providing to the server 16 named entity information ascertained by the client machine 12, execution of application 18 is performed on server 16. Nevertheless, it should be understood that this is not limiting in that tasks can also be performed on the client machine 12 or a combination of both the client machine 12 and the server 16.

In summary, named entity recognizers are distributed throughout the client-server system based on where the data for named entity recognition resides. In this manner, the query and/or set of tokens derived from the query after word breaking can be communicated to each of the named entity recognizers, obviating the need to store and keep current named entity recognition source data on one device that may only be used infrequently. Likewise, possible confidential or extensive named entity recognition source data need not be transmitted across the client-server system using the distributed system herein described. One or both of the foregoing techniques would need to be implemented to accomplish the same benefits of the distributed system herein described. Nevertheless, performance would suffer from the drawbacks previously mentioned.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of performing named entity recognition in a client-server environment in which one or more client machines, remote from a server, have client word breaking modules and client named entity rejection modules, the method comprising:
   receiving a query;
   performing word breaking on the query utilizing a first word breaking module to create a first set of tokens;
   providing the first set of tokens to one or more of the remote client machines for named entity recognition on the one or more remote client machines;
   receiving, at the server, named entity recognition client results, from the one or more client machines that identify one or more domain dependent named entities in the first set of tokens based on named entity data accessible to the one or more client machines;
   performing named entity recognition on the server to generate named entity recognition server results that identify one or more domain independent named entities in the first set of tokens based on named entity data accessible to the server;
   providing the first set of tokens, along with the named entity recognition client results and the named entity recognition server results to an application;
   wherein receiving named entity recognition client results comprises receiving named entity recognition client results identifying named entities using information accessible to the server for performing named entity recognition thereon, and wherein performing named entity recognition on the server includes performing named entity recognition on the server using yet other information different from the information used on the one or more client machines, the other information including named entity data accessible to the server but not used by the one or more client machines;
   completing a task with the application based on the first set of tokens and at least one of the named entity recognition client results and the named entity recognition server results.

2. The computer-implemented method of claim 1 and further comprising receiving the query at the one or more client machines.

3. The computer-implemented method of claim 1 wherein receiving named entity recognition client results comprises receiving domain-independent named entity recognition results.

4. The computer-implemented method of claim 1 wherein performing named entity recognition on the server comprises performing domain-dependent named entity recognition on the server.

5. The computer-implemented method of claim 1 wherein receiving named entity recognition client results comprises receiving named entity recognition client results identifying named entities known to the one or more client machines, but not known to the server.

6. The computer-implemented method of claim 5 wherein performing named entity recognition on the server comprises identifying named entities known to the server, but not known to the one or more client machines.

7. The computer-implemented method of claim 1 wherein performing named entity recognition on the server includes performing named entity recognition on the server using information accessible to the one or more client machines for performing named entity recognition thereon, and wherein performing named entity recognition on the server includes selecting to perform named entity recognition using the information rather than performing said named entity recognition on the one or more client machines, and wherein receiving named entity recognition client results comprises receiving named entity recognition client results based on yet other information, different from the information used on the server.

8. A computer-implemented method of performing named entity recognition in a client-server environment, the method comprising:
   providing a first named entity recognition module operable with a first client machine in the client-server environment and a server named entity recognition module operable with a server in the client-server environment, where the first client machine is remote from the server and communicates with the server over a network;
   providing a second named entity recognition module operable with a second client machine in the client-server environment and with the server named entity recognition module where the second client machine is remote from the server and communicates with the server over the network;
   receiving a first query at the first client machine requiring named entity recognition;
   receiving a second query at the second client machine requiring named entity recognition;
   performing named entity recognition on the first query utilizing the first client machine to identify one or more domain dependent named entities in a first set of tokens representing the first query and generated at the first client machine, based on data accessible to the first client machine to identify named entities known to the first client machine, but not known to the server or the second client machine;
   performing named entity recognition on the second query utilizing the second client machine to identify one or more domain dependent named entities in a second set of tokens representing the second query and generated at the second server, based on data accessible to the second client machine by using the second named entity recognition module on the second client machine to identify named entities known to the second client machine, but not known to the server or the first client machine;
   performing named entity recognition on the first query utilizing the server to identify one or more domain independent named entities in the first set of tokens based on data accessible to the server by using the server named entity recognition module on the server to identify named entities known to the server, but not known to the first client machine, and sending identified named entities for the first query, known to the server, to the first client machine;

performing named entity recognition on the second query utilizing the server to identify one or more domain independent named entities in the second set of tokens based on data accessible to the server by using the server named entity recognition module on the server to identify named entities known to the server, but not known to the second client machine, and sending identified named entities for the second query, known to the server, to the second client machine;

completing a task in an application deployed on the first client machine using at least information related to the identified named entities from both the first client machine and the server; and completing a task in an application deployed on the second client machine using at least information related to the identified named entities from both the second client machine and the server.

9. The computer-implemented method of claim 8 wherein performing named entity recognition on the first query utilizing the first client machine includes performing domain-independent named entity recognition on the first client machine.

10. The computer-implemented method of claim 8 wherein performing named entity recognition on the first query utilizing the first client machine includes performing named entity recognition on the first client machine using information accessible to the server for performing named entity recognition thereon, and wherein performing named entity recognition on the first client machine includes selecting to perform named entity recognition using the information rather than performing said named entity recognition on the server, and wherein performing named entity recognition on the server includes performing named entity recognition on the server using yet other information.

11. The computer-implemented method of claim 8 wherein performing named entity recognition on the server includes performing named entity recognition on the server using information accessible to the first client machine for performing named entity recognition thereon, and wherein performing named entity recognition on the server includes selecting to perform named entity recognition using the information rather than performing said named entity recognition on the first client machine, and wherein performing named entity recognition on the first client machine includes performing named entity recognition on the first client machine using yet other information.

12. A computer-implemented method of performing named entity recognition in a client-server environment, comprising:

receiving, at a server, a first set of tokens generated at a first client machine and representing words in a first query received at the first client machine;

receiving, at the server, domain dependent named entities known to the first client machine but not the server and identified by the first client machine based on the first set of tokens and based on data accessible to the first client machine;

performing named entity recognition at the server based on the first set of tokens to identify domain independent named entities in the first set of tokens based on data accessible to the server by using a server named entity recognition module, the domain independent named entities in the first set of tokens being known to the server and not to the first client machine;

sending the domain independent named entities in the first set of tokens to the first client machine for use by a first application deployed on the first client machine to perform a task;

receiving, at the server, a second set of tokens generated at a second client machine representing words in a second query received at the second client machine;

receiving, at the server, domain dependent named entities known to the second client machine but not the server and identified by the second client machine based on the second set of tokens and based on data accessible to the second client machine;

performing named entity recognition at the server based on the second set of tokens to identify domain independent named entities in the second set of tokens based on the data accessible to the server by using the server named entity recognition module, the domain independent named entities in the second set of tokens being known to the server and not the second client machine; and sending the domain independent named entities in the second set of tokens to the second client machine for use by a second application deployed on the second client machine to perform a task.

* * * * *